United States Patent [19]

Fassler

[11] 4,190,342

[45] Feb. 26, 1980

[54] MECHANISM FOR CONTROLLING A TIMED FUNCTION IN A CAMERA

[75] Inventor: Werner Fässler, Rochester, N.Y.

[73] Assignee: Eastman Kodak Company, Rochester, N.Y.

[21] Appl. No.: 19,195

[22] Filed: Mar. 9, 1979

[51] Int. Cl.² .................. G03B 9/08; G03B 17/00; G03B 17/40

[52] U.S. Cl. .................................. 354/202; 354/226; 354/267

[58] Field of Search ................ 354/36, 48, 202, 226, 354/237–240, 246–247, 256, 266–267; 355/115; 58/21.13, 22.9

[56] References Cited

U.S. PATENT DOCUMENTS

| | | | |
|---|---|---|---|
| 2,966,106 | 12/1960 | Schackert | 354/40 |
| 3,471,226 | 10/1969 | Wasielewski et al. | 354/36 X |
| 3,860,937 | 12/1973 | Wolfe | 354/64 |
| 3,952,317 | 3/1975 | Galbraith | 354/48 |
| 4,025,930 | 1/1976 | Wolff | 354/64 |

Primary Examiner—L. T. Hix
Assistant Examiner—Thomas H. Tarcza
Attorney, Agent, or Firm—Roger A. Fields

[57] ABSTRACT

A spring member is provided to oscillate a magnet selectively at different initial amplitudes and, after dampening for respective different intervals of time, at a predetermined lesser amplitude. During such oscillation, the magnet applies an attractive force to a latch for a time period that varies inversely with the amplitude. As oscillation of the magnet progressively diminishes to the predetermined amplitude, application of the magnetic force to the latch progressively increases in duration until, at the predetermined amplitude, the magnetic force is applied for a time period sufficient to move the latch to release a closing blade, which terminates an exposure interval.

8 Claims, 2 Drawing Figures

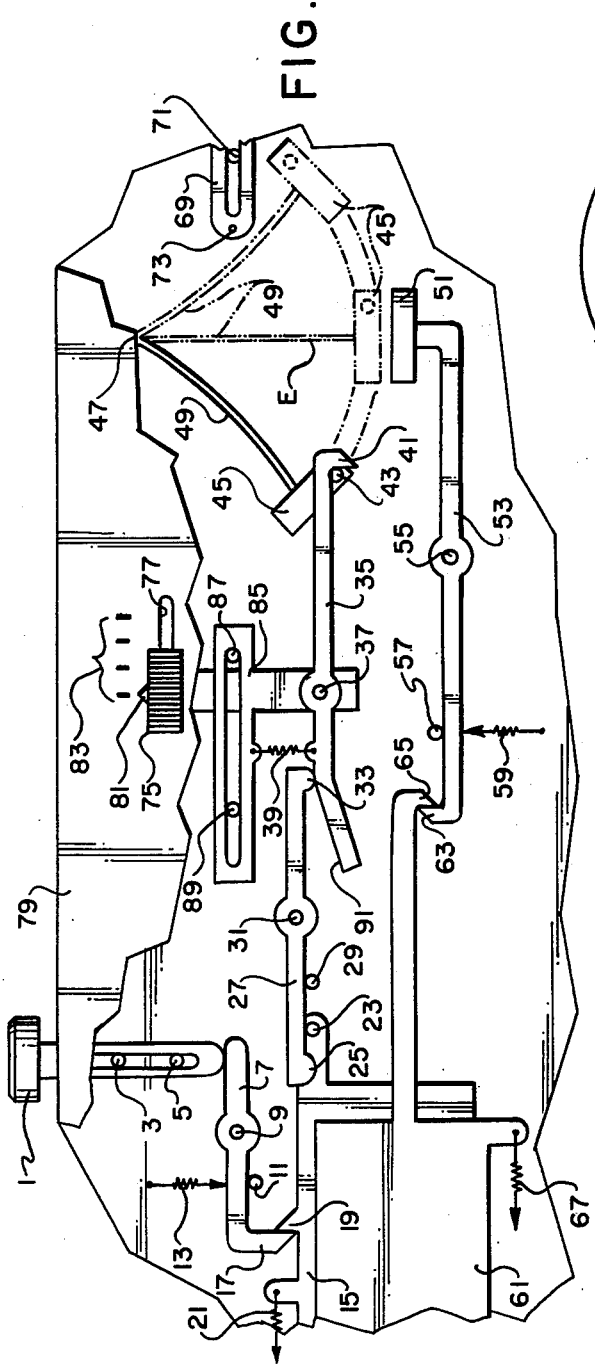
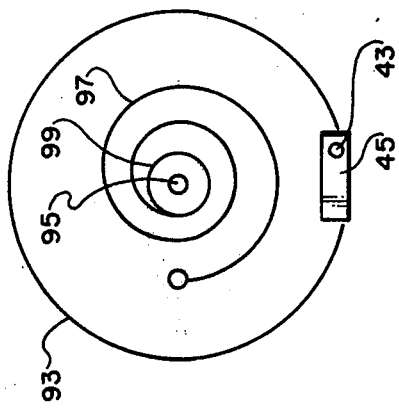
FIG. 1
FIG. 2

MECHANISM FOR CONTROLLING A TIMED FUNCTION IN A CAMERA

BACKGROUND OF THE INVENTION

1. Field of the Invention

The present invention generally relates to a mechanism for controlling a timed function, such exposure time, in a camera.

2. Description of the Prior Art

Numerous mechanisms have been devised for controlling a timed function in a camera. For example, there are a variety of devices for controlling the closing of a shutter to vary the period of time light is allowed to reach film in the camera. The simpler types may have several shutter speed settings, such as 1/60, 1/125, and 1/250 sec. The speeds are set manually, such as by moving a lever or a pointer along a scale located on the camera housing. Other, automatic types rely on light measurement for controlling the closing of the shutter. Here, the speed of the shutter is electronically determined as a function of the level of scene light reflected back into the camera. Typically, a light integrating timing circuit is energized in synchronization with movement of a shutter opening blade to initiate the timing of an exposure interval. The timing circuit subsequently actuates a shutter closing blade to terminate the exposure interval after a time period established by the timing circuit in accordance with the level of scene light received by a photocell in the circuit.

Another mechanism for controlling a timed function in a camera is a self-timer or delayed action shutter release by which a photographer can include himself in a picture. When a shutter release is pressed, exposure does not take place, but is delayed for a pre-set time—long enough for the photographer to take a position in the picture. The delay is usually achieved by allowing a spring to unwind slowly under the retarding action of a train of gears.

SUMMARY OF THE INVENTION

The present invention provides an improved mechanism for controlling a timed function, such as exposure time, in a camera. The mechanism is mechanically simpler than many prior art devices, eliminates the requirement for batteries as in electronic devices, and is extremely accurate for timing purposes.

In keeping with the teachings of the present invention, there is provided a mechanism for controlling a timed function in a camera, comprising:

means for initiating the timed function;

means operable for terminating the timed function;

means dampeningly oscillatable, beginning at selectable different amplitudes, in response to initiation of the timed function, and, after dampening for respective different intervals of time, oscillating at a predetermined lesser amplitude for operating the terminating means to terminate the timed function; and means for selecting the amplitude at which the oscillatable means is to begin oscillating.

Therefore, according to the invention, the duration of the timed function is determined by the interval of time between the selected and predetermined amplitudes of oscillation.

In a preferred embodiment of the present invention, the oscillating means is a spring member from which is suspended a magnet. The spring member and the magnet are oscillatable like a pendulum, beginning at the selectable different amplitudes, and, after dampening for respective different intervals of time, at the predetermined lesser amplitude. During such oscillation, the magnet applies an attractive force to the terminating means for a time period that varies inversely with the amplitude. As oscillation of the magnet progressively diminishes from the selected initial amplitude to the predetermined lesser amplitude, application of the magnetic force to the terminating means progressively increases in duration until, at the predetermined amplitude, the magnetic force is applied for a time period sufficient to operate the terminating means to terminate the timed function.

In one species, the present invention has application as a mechanism for controlling exposure time in a camera. According to such application, the mechanism comprises:

shutter means operable for opening and closing an aperture to provide different exposure times;

spring means, dampeningly oscillatable, beginning at selectable different amplitudes, in response to operation of the shutter means for aperture opening, and, after dampening of the spring means for respective different intervals of time, oscillating at a predetermined lesser amplitude for operating the shutter means for aperture closing; and means for selecting the amplitude at which the spring means is to begin oscillating.

Therefore, according to this species, different exposure times can be provided which are determined respectively in accordance with the different intervals of time between the selected different amplitudes and the predetermined amplitude.

BRIEF DESCRIPTION OF THE DRAWINGS

For a more complete understanding of the present invention, as well as further features thereof, reference should be had to the following detailed description of the invention taken in conjunction with the accompanying drawings in which:

FIG. 1 is a plan view of a mechanism for controlling exposure time in a camera according to a preferred embodiment of the present invention; and FIG. 2 is a plan view of an alternate embodiment of the timing structure in the mechanism of FIG. 1.

DESCRIPTION OF THE PREFERRED EMBODIMENT

An exposure time controlling mechanism according to a preferred embodiment of the present invention is incorporated in a photographic camera. Because cameras are well known, this description will be directed in particular to elements forming part of or cooperating directly with apparatus embodying the present invention. It is to be understood, however, that camera elements not specifically shown or described may take various forms known to those skilled in the camera art.

Referring now to FIG. 1 of the drawings, which illustrates the preferred embodiment of the invention, it can be seen that when a shutter release 1 is depressed for movement that is guided by two spaced guide pins 3 and 5, a shutter opening latch 7 is pivoted in a clockwise direction about a mounting pin 9, away from a stop 11 and against the contrary urging of a schematically shown return spring 13. Such pivoting of the opening latch 7 releases an opening blade 15 of a shutter by separating a latch ear 17 from a blade ear 19. The released opening blade 15 is then pulled by a schematically shown spring 21 to the left, in FIG. 1, from an original or cocked position, which initiates an exposure interval by uncovering a lens aperture, not shown. As the opening blade 15 is initially pulled to the left, a camming pin 23 located on a trailing end of the opening blade contacts an arcuate cam follower surface 25 of a lever 27. This pivots the lever 27 away from a stop 29, in a clockwise direction about a mounting pin 31. An ear 33 located on the pivoted lever 27 pivots a timing latch 35 in a counterclockwise direction about a mounting pin 37, against the contrary urging of a schematically shown return spring 39. Such pivoting of the timing latch 35 removes a latch ear 41 from engagement with a pin 43 projecting from one side of a permanent magnet 45. The magnet 45, which is a concentrated mass, is suspended from a support 47 by a single element leaf spring 49 in the manner of a pendulum.

As shown in FIG. 1, the leaf spring 49 is deflected or deformed to the left from an equilibrium position E, which produces a rightward-urging restoring force in the leaf spring that is proportional to such deflection. Release of the magnet 45 by the latch ear 41 allows the deformed spring 49 to oscillate the magnet forward to the right and backward to the left through the equilibrium position E (which is at the midpoint of the oscillation path of the magnet). As the magnet 45 oscillates in the vicinity of the equilibrium position E, it applies an attractive force to an iron block 51, supported on one end of a closing or control latch 53. This attractive force is applied to the iron block 51 for a time period that varies inversely with the amplitude of oscillation of the magnet 45, i.e., the maximum displacement of the magnet from the equilibrium position E. As oscillation of the magnet 45 progressively diminishes or dampens, the amplitude, as well as the instantaneous speed of the magnet passing through the equilibrium position E, correspondingly decreases. At the same time, application of the magnetic force to the iron block 51 correspondingly increases in duration until finally the magnet 45 is exposed to the iron block for a time period sufficient to overcome the forces which prevent the iron block from moving. Movement of the iron block 51 into contact with the magnet 45 causes the shutter closing latch 53 to pivot in a counterclockwise direction about a mounting pin 55, away from a stop 57 and against the contrary urging of a schematically shown return spring 59. Such pivoting of the closing latch 53 releases a closing blade 61 of the shutter by separating a latch ear 63 from a blade ear 65. The released blade 61 is then pulled by a schematically shown spring 67 to the left, in FIG. 1, from an original or cocked position, which terminates the exposure interval by covering the lens aperture, not shown.

The opening blade 15 and the closing blade 61 are returned against the contrary urging of the springs 21 and 67 to their original or cocked positions, in FIG. 1, in a known manner by manually actuated film advancing means, not shown. At the same time, the film advancing means operates to move a slide member 69 to the left along a guide pin 71. This causes a projecting lug 73 on the leading end of the moved slide member 69 to deflect the leaf spring 49 to the left from the equilibrium position E until the pin 43 on the magnet 45 is re-engaged by the ear 41 on the timing latch 45. The slide member 69 is then retracted from the leaf spring 49 by spring means, not shown, to avoid interfering with the leaf spring during a subsequent cycle of operation.

Means are provided for selecting different initial amplitudes respectively at which oscillation of the magnet 45 and the leaf spring 49 is to begin. As shown in FIG. 1, a slide button 75, movable along a guide slot 77 in the camera face 79, has a pointer 81 which is alignable with individual lines of a scale 83. Incremental movement of the slide button 75 similarly moves a carriage 85 along two spaced guide pins 87 and 89. The carriage 85 pivotally supports the timing latch 35 at the mounting pin 37 and is coupled to the timing latch by the return spring 39. The spring 39 operates to hold an inclined edge 91 of the timing latch 35 against the ear 33 of the lever 27. Owing to this arrangement, movement of the slide button 75 determines the angular position of the leaf spring 49, i.e., its degree of displacement from the equilibrium position E, at which the pin 43 on the magnet 45 will be engaged by the latch ear 41.

Accordingly, in response to movement of the opening blade 15 to being the exposure interval, the magnet 45 and the leaf spring 49 can begin oscillation selectively at different initial amplitudes, and after dampening for respective different intervals of time, the magnet and the leaf spring will oscillate at a predetermined lesser amplitude. At the predetermined amplitude, the magnet 45 applies its attractive force to the iron block 51 for a sufficient duration to cause the closing latch 53 to release the closing blade 61, which terminates the exposure interval. Therefore, it will be appreciated that the preferred embodiment provides a means for effecting different exposure times in accordance with the degree of displacement of the spring 49 and the magnet 45 from the equilibrium position E.

Referring now to FIG. 2, there is shown an alternate to the leaf spring 49. A flywheel 93, which supports the magnet 45 adjacent its peripheral edge, is supported for oscillation about a stationary shaft 95. A helical spring 97 has one end connected to the flywheel 93 and another end connected to a collar 99 fixed to the stationary shaft 95. When the flywheel 93 is rotated in a clockwise direction about the shaft 95 for a desired angle and then released, the restoring force produced in the helical spring 97 will cause it to oscillate the flywheel.

The present invention has been described in detail with particular reference to the preferred embodiment thereof, but it will be understood that variations and modifications can be effected within the spirit and scope of the invention.

I claim:

1. A mechanism for controlling a timed function in a camera, comprising:
   means for initiating the timed function;
   means operable for terminating the timed function;
   means dampeningly oscillatable, beginning at selectable different amplitudes, in response to initiation of the timed function, and, after dampening for respective different intervals of time, oscillating at a predetermined lesser amplitude for operating said terminating means to terminate the timed function; and
   means for selecting the amplitude at which said oscillatable means is to begin oscillating.

2. A mechanism for controlling a timed function in a camera, comprising:
   means for initiating the timed function;
   means operable by a magnetic force for terminating the timed function;

means for applying a magnetic force to said terminating means, which when applied for a sufficient duration operates said terminating means;

means for moving said magnetic force applying means, beginning at selectable different speeds, in response to initiation of the timed function, and, after movement for respective different intervals of time, moving said magnetic force applying means at a predetermined lesser speed for applying the magnetic force to said terminating means for the sufficient duration to operate said terminating means for terminating the timed function; and means for selecting the speed at which said moving means is to begin moving.

3. A mechanism as recited in claim 2, wherein said moving means includes a spring member deformable from an equilibrium position to a plurality of positions respectively at which different restoring forces are produced corresponding to the different speeds.

4. A mechanism as recited in claim 3, wherein said magnetic force applying means is a concentrated mass, and wherein said spring member is a single element leaf spring suspended at one end and secured to said concentrated mass at another end in the manner of a pendulum.

5. A mechanism for controlling exposure time in a camera, comprising:

shutter means operable for opening and closing an aperture to provide different exposure times;

spring means dampeningly oscillatable, beginning at selectable different amplitudes, in response to operation of said shutter means for aperture opening, and, after dampening for respective different intervals of time, oscillating at a predetermined lesser amplitude for operating said shutter means for aperture closing; and means for selecting the amplitude at which said spring means is to begin oscillating.

6. A mechanism for controlling exposure time in a camera, comprising:

shutter means operable for opening and closing an aperture to provide different exposure times;

a control member movable to initiate operation of said shutter means for aperture closing;

an oscillatable member including means for applying a discrete force to said control member, which when applied for a sufficient duration moves said control member to initiate operation of said shutter means for aperture closing;

means, responsive to operation of said shutter means for aperture opening, for beginning oscillation of said oscillatable member;

means supporting said oscillatable member for dampening oscillation, beginning at selectable different amplitudes, and, after dampening for respective different intervals of time, oscillating at a predetermined lesser amplitude for applying the discrete force to said control member for the sufficient duration to move it to initiate operation of said shutter means for aperture closing; and means cooperating with said supporting means for selecting the amplitude at which said oscillatable member is to begin oscillating.

7. A mechanism as recited in claim 6, wherein said force applying means is a magnet which subjects said control member to a field of attraction during oscillation of said oscillatable member.

8. A mechanism for controlling exposure time in a camera, comprising:

shutter means operable for opening and closing an aperture to provide different exposure times;

a control member movable by a magnetic force to initiate operation of said shutter means for aperture opening;

means for applying a magnetic force to said control member, which when applied for a sufficient duration moves said control member to initiate operation of said shutter means for aperture closing;

means for moving said magnetic force applying means, beginning at selectable different speeds, in response to operation of said shutter means for aperture opening, and, after movement for respective different intervals of time, moving said magnetic force applying means at a predetermined lesser speed for applying the magnetic force to said control member for the sufficient duration to move it to initiate operation of said shutter means for aperture closing; and means cooperating with said moving means for selecting the speed at which said magnetic force applying means is to begin moving.

* * * * *